Dec. 13, 1960 S. K. WOOD ET AL 2,963,851
FLUID TIMED PARKING METER
Filed March 27, 1959

INVENTORS
STRAUD K. WOOD
WILMER J. FRIESEN
BY Kenneth M. Thorpe
Atty.

United States Patent Office 2,963,851
Patented Dec. 13, 1960

2,963,851

FLUID TIMED PARKING METER

Straud K. Wood, 322 E. 3rd St., and Wilmer J. Friesen, 1016 W. 2nd St., both of Hutchinson, Kans.

Filed Mar. 27, 1959, Ser. No. 802,410

1 Claim. (Cl. 58—141)

This invention relates to parking meters and has for its chief object to produce an inexpensive parking meter of simple construction and embodying a minimum number of parts.

Another object is to produce a novel timing mechanism for parking meters embodying fluid flow through a metering orifice, the time interval being controlled by the rate of flow or amount of liquid transferred from one container to another.

A further object of the invention is to produce a timing meter particularly designed for use with a non-freezing liquid of such consistency that it will pass through an orifice at the same rate of flow regardless of temperature changes, winter and summer.

With the general objects named in view and others as will hereinafter appear, the invention consists in certain new and useful features of construction and combination of parts as hereinafter described and claimed; and in order that it may be fully understood, reference is to be had to the accompanying drawing, in which:

Figure 2:
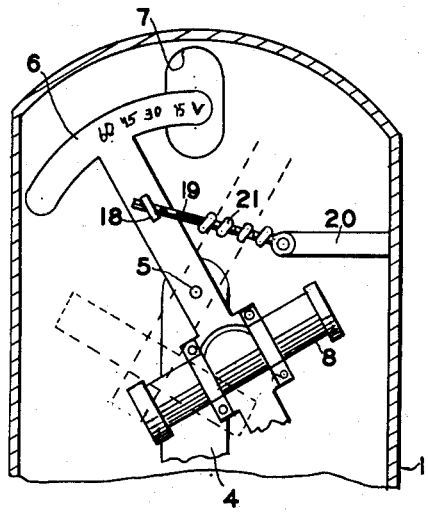
Figure 2 is a fragmental view of the construction shown in Figure 1 as it appears at the end of a timed interval.

In the said drawing, where like reference characters identify corresponding parts in all of the figures, 1 is a housing or casing which is closed at one side with a removable cover plate 2. Housing 1 is mounted on the usual supporting post 3 adjacent a parking area.

Mounted within the housing 1 is a standard 4 and rocking on a shaft 5 carried at the upper end of the standard is a T-shaped timing rocking arm 6, having its upper end marked with time intervals which are visible through a window 7, excess or overtime marking being indicated by the letter V.

Mounted at right angles to the lower end of the arm 6 is a container or tube 8 having a predetermined quantity of timing fluid which is not affected by temperature changes. The container is divided into two compartments 9 and 10 by an inclined partition 11 for quick discharge of fluid from chamber 9 to 10 as will hereinafter appear. The lower end of the partition 11 is provided with a metering orifice 12, and the upper end of the container 8 is formed with a by-pass 13 for quick discharge of fluid from the chamber 9 to the chamber 10 when the container is oscillated to the dotted line position of Figure 2 for zero setting or initiation of a parking or timed interval.

Figure 1:
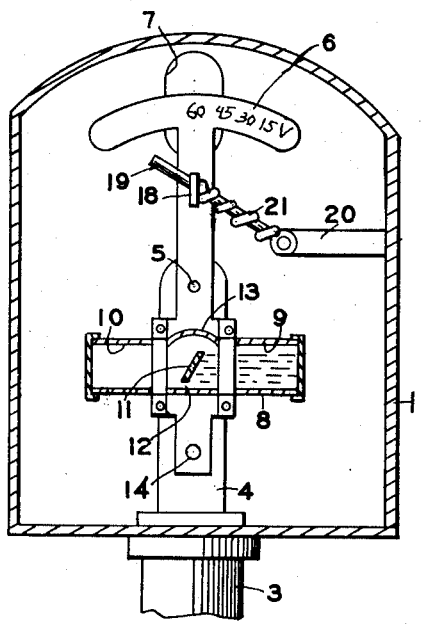
Figure 1 is a face view of a meter embodying the invention with the cover or face plate removed, and the timing mechanism in the position it assumes at the start of a timing operation.
Figure 3:
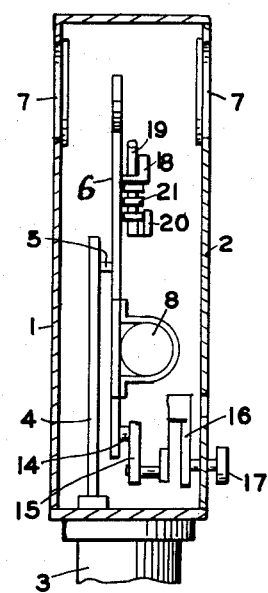
Figure 3 is a section through the casing or housing of Figure 1 with the parts shown in elevation.

The indicator arm 6 and its associated parts are so balanced that when the fluid is in the compartment 9 of the container 8, the device will be horizontal as shown in Figure 1. In this position fluid starts to flow through the orifice 12 into the compartment 10 and the structure becomes unbalanced and the indicating arm 6 starts to move to the full line position shown in Figure 2. The orifice 12 and the quantity of liquid govern controlled time.

The lower end of the indicator arm 6 carries a pin 14 which is adapted to be actuated by a cam or link 15 on a coin controlled mechanism 16 operated by a manual handle 17, to throw the mechanism to the dotted line position of Figure 2 and transfer the fluid from compartment 10 to compartment 9. To cushion this movement and to insure return of the container 8 to balanced position, manual operation is resisted by a spring 21 mounted on a guide rod 19 pivoted to arm 20 projecting from the housing 1, the other or free end of the arm resting in a guide yoke 18 carried by the indicating arm 6.

It will be apparent that the length of the time interval is controlled by the amount of fluid to be transferred from compartment 9 to compartment 10, and by the size of the orifice 12 and the fluidity of the transferred material. If the device is manipulated to return only half of the fluid from compartment 10 to compartment 9, it is evident that the timed interval will be halved, etc. From the above description and drawing it will be apparent that we have produced a device having all of the features of advantage set forth as desirable, and while we have described and illustrated the preferred embodiment, it is to be understood that we reserve the right to all changes within the spirit and scope of the appended claim.

We claim:

A fluid timing device comprising a housing, a T-shaped arm having its stem pivoted in the housing so that said arm may rock in a vertical plane, the cross-head of the T-arm being provided with time elapse indicators, a liquid-containing tube carried by the stem of the T-arm below the pivotal point thereof, said tube containing a liquid and being internally partitioned with a timing orifice in the partition to limit flow of liquid in one direction and a second orifice permitting instantaneous passage of all liquid in the opposite direction, a resilient abutment to permit swinging of the T-arm to effect instantaneous transfer of the liquid and to position the T-arm for timing liquid flow, a pin carried by the lower end of the stem of the T-arm, a coin controlled shaft journaled in the housing, and a cam on said shaft to contact the pin and reset the liquid tube by oscillation of the T-arm into contact with said resilient abutment.

References Cited in the file of this patent

UNITED STATES PATENTS

| 330,180 | White | Nov. 10, 1885 |
| 872,581 | Pennington | Dec. 3, 1907 |
| 1,235,579 | Lincoln | Aug. 7, 1917 |
| 2,279,121 | Kistler | Apr. 7, 1942 |
| 2,288,813 | Long | July 7, 1942 |

FOREIGN PATENTS

| 23,580 | Norway | July 21, 1913 |